Figures 1, 2:
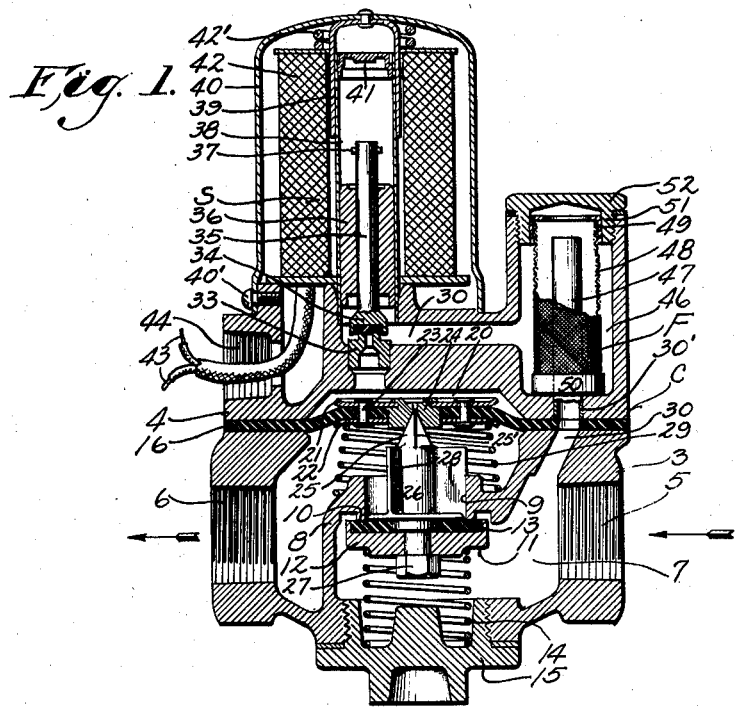

Dec. 14, 1937.  R. W. JOHNSON  2,102,076

VALVE CONTROL

Filed May 31, 1935

INVENTOR
Roy W. Johnson
BY
ATTORNEYS

Patented Dec. 14, 1937

2,102,076

UNITED STATES PATENT OFFICE 2,102,076

VALVE CONTROL

Roy W. Johnson, Milwaukee, Wis.

Application May 31, 1935, Serial No. 24,177

7 Claims. (Cl. 137—139)

This invention relates in general to a control valve especially adapted for use in a water control valve in air conditioning apparatus and other commercial work, although also capable of advantageous use in controlling the flow of other liquids as well as of air and other gases.

One of the objects of the invention is to provide a valve of this character which is of very simple construction and so closely and compactly organized as to be susceptible of easy and economic production and yet is readily installed and when installed is highly efficient and reliable in use as well as certain, noiseless and effective in operation.

In carrying out the invention, a valve casing is provided and has an inlet and an outlet connected by a passage traversed by a ported partition. A main valve coacts with the ported partition to control flow from said inlet to said outlet. The main valve is biased to closed position. For opening the main valve a pressure responsive device is provided and may be in the form of a diaphragm operatively connected to said main valve. One side of the diaphragm is exposed to the pressure on the outlet side of the valve. A bypass extends from the inlet side of the valve to the other side of the diaphragm. A solenoid valve controls the flow through said bypass and when open allows the pressure to build up against the pressure responsive device which in turn opens the main valve. When the solenoid is de-energized the flow of fluid under pressure is shut off and the main valve closes smoothly and noiselessly but certainly. A bleed port is provided to relieve the pressure responsive device of the fluid pressure that had been effective thereon.

To insure certainty of operation a filtering strainer is incorporated in a novel manner in the bypass between the inlet and the solenoid valve and is so constituted as to intercept any foreign or solid particles and preclude their passage to the solenoid valve or to the pressure responsive device and hence precludes such particles from impairing the operation of either of those elements. The filtering device may be readily removed and cleaned or replaced.

Where the pressure responsive device is in the form of a diaphragm it is preferably provided with a bleed port provided with a valve seat. A valve coacts with said seat and is provided on the end of a stem connected to the main valve. Thus, the valve stem serves also to transmit movement between the diaphragm and the main valve. Moreover, as this valve and its seat move relative to each other upon closing of the main valve, they are self-cleaning. Preferably, a bleed groove is provided in the operative end of the valve stem.

Other objects and advantages reside in certain novel features of the construction, arrangement and combination of parts which will be hereinafter more fully described and particularly pointed out in the appended claims, reference being had to the accompanying drawing, forming a part of this specification, and in which:

Figure 1 is a view showing a control valve embodying the present invention and illustrating the same in longitudinal vertical section, parts being broken away and parts being shown in section for the sake of illustration; and Figure 2 is a view in elevation of the valve shown in Figure 1.

Referring to the drawing, it will be seen that a control valve embodying the present invention may comprise a casing designated generally at C and, in the construction illustrated, made up of a lower or bottom casing member 3 and an upper casing member 4. The lower casing member 3 is provided with an inlet 5 internally threaded or otherwise adapted to connection with an oil supply line (not shown) and also with an outlet 6 similarly adapted for connection with a distributing line (not shown) which may be connected to an oil burner or other point of delivery. Between the inlet 5 and outlet 6 the lower casing member is provided with a passage 7. Across this passage 7 an internal partition 8 extends. The horizontal portion of this partition is provided with a valve port 9, the lower end of which is constituted to provide a valve seat 10. Cooperable with the valve seat 10 of the partition 8 is a main valve designated generally at 11. This main valve 11 comprises a flanged metal disc 12 which carries a disc-like sealing member or seat engaging member 13 of rubber or other suitable composition. The main valve 11 is biased to closed position by reason of the fact that it seats with the pressure and also by virtue of the provision of an expansible coil spring 14, the upper end of which bears against the metal disc 12 of the valve and the lower end of which abuts against a removable closure plug 15 threadedly interconnected with the casing member. The plug 15 when removed facilitates access to the main valve and its seat.

From the foregoing, it will be understood that the main valve 11 controls the flow of fluid from the inlet to the outlet in that it shuts off this flow when it is closed and provides for or allows the flow when it is open.

For the purpose of opening the valve a pressure responsive device is provided and may comprise a diaphragm 16, the periphery of which is confined between the opposed peripheral portions of the upper and lower casing members 4 and 3, respectively. From Figure 2 it will be observed that these casing members 3 and 4 have peripheral or marginal flanged formations 17 and 18 which are fastened together in the assembly by screws or other fastening devices designated at 19. These fastening devices traverse the peripheral portion of the diaphragm and cause the flanged formations 17 and 18 to firmly clamp the peripheral portion of the diaphragm in position and incidently bring about sealing engagement between such portion of the diaphragm and the flanged formation. In the upper casing member 4 and above the active portion of the diaphragm a pressure chamber 20 is provided. When pressure is supplied to this chamber the diaphragm is flexed downwardly and this downward movement is transmitted to the valve 11 for opening the same.

On the opposite sides of the diaphragm 16 circular metal plates 21 and 22 are disposed and are firmly secured and clamped to the diaphragm by rivets or the like designated at 23. These plates 21 and 22 and the diaphragm 16 are centrally apertured to receive a rather thick and disc-like metal valve seat 24 which may be clamped into engagement with the plate 21 or otherwise secured thereto. The disc 24 is provided with a central opening extending axially therethrough. The lower portion of this opening is tapered to coact with the similarly formed upper end 25 of a valve stem 26. The lower end of the valve stem 26 is appropriately secured to the main valve 11 as indicated at 27. Guide wings 28 may be integrally formed with the valve stem 26 and coact with the wall of the port 9 to guide this valve stem 26 and the main valve 11 in their movements. The tapered end 25 of the valve stem 26 is preferably provided with a suitable bleed groove 25'.

The diaphragm 16 may be biased to the position shown in Figure 1 by a coil spring 29 interposed between its lower disc 22 and the horizontal portion of the partition 8. Pressure is supplied to the chamber 20 from the inlet side of the valve and for this purpose the casing members 3 and 4 are provided with a by-pass 30 extending from the passage 7 at a point adjacent the inlet 5 up through the casing member 3 and through openings in the diaphragm and upper casing member 4 to the chamber 20. Flow of fluid through the passage 30 from the inlet side of the valve to the pressure chamber 20 is controlled by a solenoid valve designated generally at S. For this purpose a ported valve seat 33 is suitably secured in the passage 30 adjacent the point of its communication with the chamber 20 and is so arranged that the axis of the port or opening through said seat is vertically disposed. Cooperable with the valve seat 33 is a valve 34 provided at the lower end of a vertical valve stem 35. Slidably mounted on the valve stem 35 is the armature or plunger 36 of the solenoid valve. This armature or plunger 36 is shorter than the valve stem 35 and when the valve is closed its upper end is disposed below and in spaced relation to a cross pin 37 carried by the valve stem. The plunger 36 is a free sliding fit in a tube 38 of non-magnetic material, which tube has its lower end in sealing engagement with the upper part 4 of the casing and has its upper end similarly associated with an elongated sleeve-like cap 39 fastened to the cylindrical cover 40 provided for the solenoid valve and fastened in position by screw 40'. The upper end of the sleeve 38 has a closure member 41 fitted in and secured thereto. Surrounding the sleeve 38 are the windings 42 of the solenoid valve and these windings have their terminals connected by leads 43 extending out through an opening 44 in the upper part of the casing to a source of electric current. A coil spring 42' may be used to hold the windings 42 in position.

With this arrangement, when the windings 42 of the solenoid valve are energized, the plunger 36 is pulled upwardly from the position shown in Figure 1. Inasmuch as the plunger 35 is not attached directly to the valve stem 35 it travels a short distance and gains momentum before its upper end strikes the cross pin 37 and raises the valve 34 from its seat. The plunger 36 and valve stem 35 float in the coil or windings and do not touch the top or closure for the upper end of the guide tube 38. Not only the tube 38 but also the valve stem 35 are non-magnetic so that no mineral particles can be attracted which might prevent a complete and effective shut off when the coil 42 is de-energized.

To insure certainty of operation a filtering strainer is incorporated in a novel manner in the bypass 30 between the point at which it communicates with the inlet side of the valve, that is, the passage 7 adjacent the inlet 5 and the solenoid valve S. For this purpose the upper casing member 4 is provided with a vertical filtering chamber 46 which intersects the passage 30. In this chamber 46 a filtering strainer designated generally at F is provided and comprises a stand tube 47 having its lower end snugly fitted in the portion 40' of the bypass 30. This stand tube 47 is open-ended so that one end communicates with the inlet side of the bypass 30 and its other or upper end communicates with the interior of the filtering chamber. Surrounding the stand tube 47 is a reticulated or screen-like strainer sleeve 48, the ends of which are provided with metallic caps 49 and 50. The inner marginal edge of the opening in the lower cap 50 is suitably secured to the portion of the stand tube which projects therethrough. The upper cap 49 is fitted in a downwardly extending flange 51 of a removable closure cap 52 threadedly interconnected with the upper open end of the filtering chamber. This cap 52 closes off communication of the filtering chamber with the exterior and holds the filtering strainer in proper position.

With a valve constructed in this manner, when the windings 42 are energized the valve 34 is opened and fluid under pressure flows from the inlet 5 and passage 7 through the bypass 30 into the chamber 20. In flowing through the bypass the fluid flows up through the stand tube 47 and then passes outwardly through the screen 52 and past the valve 34 into the chamber 20. When pressure builds up in the chamber 20 it flexes the diaphragm 16 downwardly. Such movement of the diaphragm acts through the stem 26 to open the valve 11 against the action of its spring 14 and against the action of the pressure. With the valve 11 open fluid flows through the passage 7 from the inlet 5 to the outlet 6. However, as soon as the windings 42 are de-energized the bypass is closed, both the valve 34 and stem 35, as well as the plunger 36, dropping by gravity to a position which closes the valve. The pressure in the chamber 20 drops and the springs 14 and 29 cause the main valve 11 and the diaphragm 16 to move upwardly until the valve 11 closes. As the valve 11 closes the diaphragm continues to drift upwardly slightly beyond the position shown in Figure 1 under the influence of its spring 29 so that the valve seat 24 moves with respect to the tapered end 25 of the valve stem 26 and then moves back thereon to clear these parts.

It will be noted that when the valve is open the pressures on the opposite sides of the diaphragm 16 are substantially balanced. The action of the valve is quick and certain although noiseless and uniformity of action over a long period of use is insured by the novel manner of incorporating the filtering strainer in the valve and by the provision made to prevent attraction of grit to the solenoid valve or the deposit of such particles on the coacting parts of the diaphragm valve. Nevertheless, the structure is extremely simple and compactly and closely organized.

While I have shown and described one construction in which the invention may be advantageously embodied, it is to be understood that this construction has been selected merely for the purpose of illustration or example and that various changes in the size, shape and arrangement of the parts may be made without departing from the spirit of the invention or the scope of the subjoined claims.

The invention claimed is:

1. A control valve of the character described comprising a bottom casing member having an inlet and an outlet and provided with a ported partition between said inlet and outlet, a main valve cooperable with said ported partition to regulate flow therethrough, there being means biasing said main valve to closed position, an upper casing member connected to said lower casing member, a diaphragm disposed between said casing members and connected to said main valve, there being a pressure chamber in said upper casing above said diaphragm, said casing members having a bypass therein leading from said inlet to said pressure chamber, there being a valve seat in said bypass, a valve cooperable with said valve seat to control flow from the inlet through the bypass to the pressure chamber, a vertical stem rigid with the valve, and electromagnetic means for opening the valve including a winding, a core cooperatively related to the winding and loosely though positively engageable with the stem of the valve to effect opening of the valve when the winding is energized, said core, valve and stem causing the valve to close under the influence of gravity when the winding is de-energized, and a tube having its upper end closed and its lower end open and in sealing engagement with the upper casing member and communicating with said bypass, said tube enclosing said valve stem and said core.

2. A control valve of the character described comprising a bottom casing member having an inlet and an outlet and provided with a ported partition between said inlet and outlet, a main valve cooperable with said ported partition to regulate flow therethrough, there being means biasing said main valve to closed position, an upper casing member connected to said lower casing member, a diaphragm disposed between said casing members and having a port therethrough and provided with a valve seat surrounding said port, a stem carried by the main valve and having a tapered end cooperable with the valve seat of said last-named port, a spring between said diaphragm and said ported portion, there being a pressure chamber in said upper casing above said diaphragm, said casing members having a bypass therein leading from said inlet to said pressure chamber and a solenoid valve in said bypass controlling flow from said inlet to said pressure chamber.

3. A control valve of the character described comprising a casing having an inlet and an outlet, a main valve controlling flow from said inlet to said outlet, a spring biasing said valve to closed position, a diaphragm having one side exposed to the outlet side of the valve, said diaphragm having a port therethrough and being provided with a valve seat around said port, a valve stem carried by said main valve and cooperable with said port, said valve stem having its active end portion provided with a bleed groove, there being a bypass between said inlet and the other side of the diaphragm, and means for controlling flow through said bypass.

4. A control valve of the character described comprising a casing having an inlet and an outlet, a main valve controlling flow from said inlet to said outlet, a spring biasing said valve to closed position, a diaphragm having one side exposed to the outlet side of the valve, said diaphragm having a port therethrough and being provided with a valve seat around said port, a valve stem carried by said main valve and cooperable with said port, there being a bypass between said inlet and the other side of the diaphragm, and means for controlling flow through said bypass.

5. A control valve of the character described comprising a casing having an inlet and an outlet and provided with a ported partition between said inlet and said outlet, a main valve cooperable with said ported partition to control flow therethrough, a spring biasing said main valve to closed position, a diaphragm having one side exposed to said outlet, a spring between said diaphragm and said ported partition, said diaphragm having a port therethrough and being provided with a valve seat around said port, a valve stem carried by said main valve and cooperable with the port of said diaphragm, there being a bypass between said inlet and the other side of said diaphragm, and means for controlling said bypass.

6. A control valve of the character described comprising a casing having an outlet and an inlet and provided with a ported partition between said inlet and said outlet, a main valve cooperable with said ported partition to control flow therethrough, a spring biasing said main valve to closed position, a diaphragm having one side exposed to said outlet, a spring between said diaphragm and said ported partition, said diaphragm having a port therethrough and being provided with a valve seat around said port, a valve stem carried by said main valve and cooperable with the port of said diaphragm, there being a bypass between said inlet and the other side of said diaphragm, and means for controlling said bypass, said diaphragm, main valve and springs being so proportioned that upon closure of said main valve the valve seat of said diaphragm and its cooperable valve stem move relative to each other to effect automatic clearing and cleaning of said relatively movable parts.

7. A control valve of the character described comprising a bottom casing member having an inlet and an outlet and provided with a ported partition between said inlet and outlet, a main valve cooperable with said ported partition to regulate flow therethrough, there being means biasing said main valve to closed position, an upper casing member connected to said lower casing member, a diaphragm disposed between said casing members, said upper casing member and said diaphragm defining a pressure chamber, said casing members having a bypass leading from the inlet to said pressure chamber, there being a valve seat, disposed in the bypass, and provided on the upper casing member, a valve cooperable with said valve seat to regulate flow from the inlet through the bypass to the pressure chamber, said valve having a vertically extending stem, a solenoid mounted on the upper casing member and having a winding and a core, said core being loosely but positively engageable with the valve stem so as to open the valve when the solenoid is energized, said valve, said stem and said core acting under the influence of gravity to close the valve when the solenoid is de-energized, and a tube provided with a closed upper end and having an open lower end in sealing engagement with said upper casing member and in open communication with said bypass, said tube housing said core and said valve stem.

ROY W. JOHNSON.